(12) United States Patent
Fisher

(10) Patent No.: US 7,044,086 B2
(45) Date of Patent: May 16, 2006

(54) ANIMAL RAISING AND LOWERING SYSTEM

(75) Inventor: Larry Allen Fisher, Jonesville, MI (US)

(73) Assignee: Larry A. Fisher, Jonesville, MI (US)

( * ) Notice: Subject to any disclaimer, the term of this patent is extended or adjusted under 35 U.S.C. 154(b) by 96 days.

(21) Appl. No.: 10/806,004

(22) Filed: Mar. 22, 2004

(65) Prior Publication Data

US 2004/0194734 A1    Oct. 7, 2004

Related U.S. Application Data

(60) Provisional application No. 60/456,651, filed on Mar. 21, 2003.

(51) Int. Cl.
*A01K 29/00*    (2006.01)
*A01K 15/04*    (2006.01)
*A61D 3/00*    (2006.01)

(52) U.S. Cl. .................. 119/843; 119/674; 119/473; 119/522; 119/755; 181/141

(58) Field of Classification Search ............. 119/843, 119/753, 755, 512, 674, 675, 756, 722, 728, 119/846, 847, 848, 849, 473, 751, 752, 522, 119/676; 168/44; 108/11, 14, 144.11, 147.22, 108/118, 145; 182/141

See application file for complete search history.

(56) References Cited

U.S. PATENT DOCUMENTS

| | | | | |
|---|---|---|---|---|
| 89,379 A * | 4/1869 | Blackburn | .................. | 168/44 |
| 124,452 A | 3/1872 | Shimer | | |
| 136,883 A * | 3/1873 | Von Ehren | .................. | 182/47 |
| 286,389 A | 10/1883 | Coffey | | |
| 388,569 A | 8/1888 | Martin | | |
| 457,345 A | 8/1891 | Fox | | |
| 1,031,818 A * | 7/1912 | Putman | ..................... | 182/116 |
| 1,318,202 A | 10/1919 | Garnier | | |
| 1,330,807 A | 2/1920 | Ilieff | | |
| 2,229,588 A * | 1/1941 | Parker | ....................... | 119/752 |
| 2,848,977 A * | 8/1958 | Prestrud et al. | ............ | 119/674 |
| 3,208,432 A * | 9/1965 | Fisk | ............................ | 119/756 |
| 3,237,921 A * | 3/1966 | Jay | ............................ | 254/122 |
| 3,659,653 A * | 5/1972 | Allsup | ........................ | 168/44 |
| RE27,914 E * | 2/1974 | King | ............................ | 182/16 |
| 3,796,282 A * | 3/1974 | Denier et al. | ............... | 182/141 |
| 4,165,714 A | 8/1979 | Weissman et al. | | |
| 4,288,195 A * | 9/1981 | Brewer | ....................... | 414/608 |
| 4,432,305 A * | 2/1984 | Vernese | ...................... | 119/752 |
| 4,444,150 A * | 4/1984 | Hueftle et al. | ............. | 119/522 |
| 4,457,403 A * | 7/1984 | Ream | ........................... | 187/244 |
| 4,509,461 A * | 4/1985 | Peck | ........................... | 119/753 |
| 4,511,110 A * | 4/1985 | Moller | ....................... | 248/421 |
| RE32,052 E * | 12/1985 | Rosenberg et al. | ......... | 119/756 |
| 4,558,847 A * | 12/1985 | Coates | ....................... | 254/9 C |
| 4,572,328 A * | 2/1986 | Benko | .......................... | 182/1 |
| 4,577,821 A * | 3/1986 | Edmo et al. | ................ | 108/145 |
| 4,655,466 A * | 4/1987 | Hanaoka | ................ | 280/47.371 |
| 4,762,089 A | 8/1988 | McNulty | | |
| 5,035,204 A | 7/1991 | Knoss | | |
| 5,138,981 A * | 8/1992 | Akins | ......................... | 119/732 |

(Continued)

*Primary Examiner*—Yvonne R. Abbott
(74) *Attorney, Agent, or Firm*—Fraser Martin & Miller LLC; Donald R. Fraser

(57) ABSTRACT

An elevator-type mechanism which raises and lowers an animal into desired vertical position to facilitate treatment of injuries, treatment of illnesses, grooming, and the like of the animal.

14 Claims, 5 Drawing Sheets

U.S. PATENT DOCUMENTS

| | | | |
|---|---|---|---|
| 5,213,061 A * | 5/1993 | Zito | 119/752 |
| 5,441,016 A * | 8/1995 | Ricketts | 119/723 |
| 5,588,377 A * | 12/1996 | Fahmian | 108/145 |
| 5,634,438 A * | 6/1997 | Wilson | 119/752 |
| 5,915,334 A * | 6/1999 | Cummings et al. | 119/723 |
| 6,199,508 B1 | 3/2001 | Miale et al. | |
| 6,230,657 B1 * | 5/2001 | Read | 119/502 |
| 6,230,662 B1 | 5/2001 | Miale et al. | |
| 6,325,154 B1 * | 12/2001 | Keeler | 168/44 |
| 6,447,234 B1 | 9/2002 | Sinn et al. | |
| 6,516,478 B1 * | 2/2003 | Cook et al. | 5/611 |
| 6,516,753 B1 * | 2/2003 | Taylor | 119/756 |
| 6,705,238 B1 * | 3/2004 | Heckert | 108/145 |
| 6,789,829 B1 * | 9/2004 | Kapels | 296/11 |
| 2004/0094077 A1 * | 5/2004 | Stone | 108/147 |

\* cited by examiner

US 7,044,086 B2

ANIMAL RAISING AND LOWERING SYSTEM

CROSS-REFERENCE TO RELATED APPLICATION

This application claims the benefit of U.S. provisional patent application Ser. No. 60/456,651, filed Mar. 21, 2003, hereby incorporated herein by reference.

FIELD OF THE INVENTION

The present invention relates to an animal raising and lowering system and more particularly to an elevator-type mechanism to raise and lower an animal into respective upper level, ground level, and lower level positions.

BACKGROUND OF THE INVENTION

Grooming of animals, especially large quadrupeds, often results in a handler of the animal being subjected to undesirable bending and reaching positions resulting in fatigue and pain. Such is also the case when attempting to treat injuries or illnesses of animals. In addition, shoeing of horses can be difficult for a farrier due to the size and weight of the horse, and the bent over position required during the hoof trimming and shoeing process. Additionally, injury to the farrier can result when an animal is resistant to being shod.

A solution to these ergonomic problems may be to elevate the animal to facilitate working on the legs; or lowering the animal to facilitate working on the upper body and head. However, the lifting and lowering of large animals is difficult without causing injury or discomfort. Various systems utilizing hip clamps or a hoist and sling arrangement are available. Such arrangements often require bulky machinery and may result in injury or discomfort to the animals being treated.

The use of slings can be satisfactory in some instances. However, slings have fallen out of favor because of the length of time required for setup, and the degree of difficulty in the setup and the balancing of the animal on the sling.

Devices to aid horse shoeing are well known in the prior art. U.S. Pat. No. 124,452 to Shimer, U.S. Pat. No. 286,389 to Coffey, U.S. Pat. No. 457,345 to Fox, and U.S. Pat. No. 1,330,807 to Ilieff disclose devices for immobilizing a horse's leg while raising the hoof to a limited degree whereby a horseshoe may be attached to the hoof. These devices are individually complex and are not disclosed to be used with other types of devices. Such structures are also inherently unstable and may result in an injury to the animal or the farrier.

U.S. Pat. No. 388,569 to Martin and U.S. Pat. No. 1,318,202 to Garnier disclose additional structures for immobilizing a horse. U.S. Pat. No. 4,762,089 to McNulty discloses a device to tether a horse within a grooming stall, and U.S. Pat. No. 5,035,204 to Knoss discloses a head restraint device for a livestock chute. Neither patent discloses a device enabling the restraining and shoeing of horse in a safe, quick, and easy manner.

It would be desirable to produce a system for raising and lowering an animal which minimizes injury and discomfort to the animal and facilitates a grooming, shoeing, and treatment of the animal.

SUMMARY OF THE INVENTION

Consistent and consonant with the present invention, a system for raising and lowering an animal which minimizes injury and discomfort to the animal and facilitates a grooming, shoeing, and treatment of the animal, has surprisingly been discovered.

The system for raising and lowering an animal comprises: a platform for supporting an animal and movable to an upper level, an intermediate level, and a lower level; a vertically movable structure mounted for supporting the platform to selectably cause the platform to move to the upper level, the intermediate level, and the lower level; and a rail structure supported by the platform to restrain the animal.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DESCRIPTION OF THE PREFERRED EMBODIMENT

Figure 1:
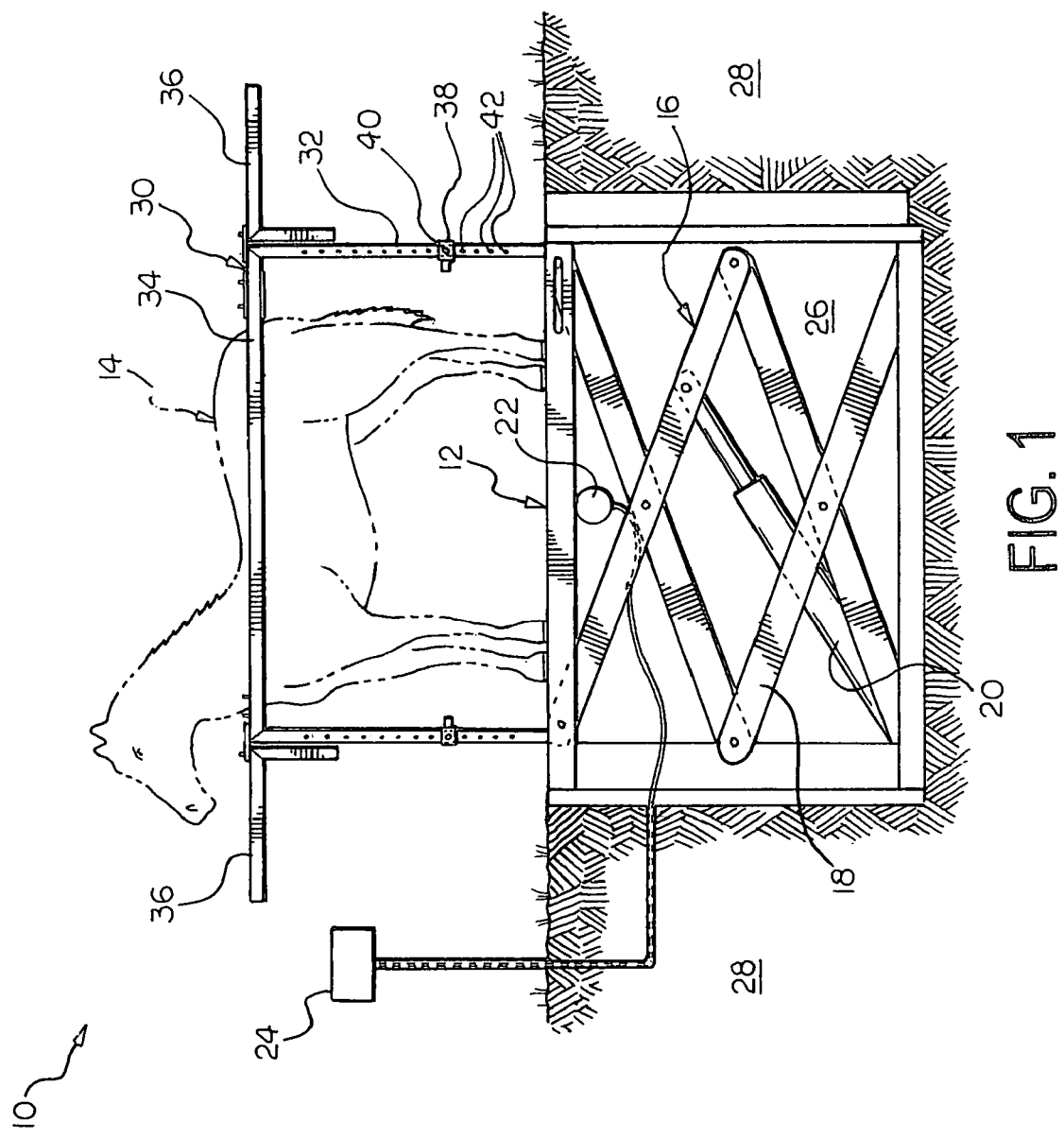
FIG. 1 is an elevational view of an animal raising and lowering system showing a supported animal at an intermediate level or ground level.

Referring now to FIG. 1, there is shown an animal raising and lowering system generally indicated by reference numeral 10 for selectively raising and lowering animals to various heights in accordance with the present invention. The raising and lowering system 10 includes a platform 12 capable of supporting an animal 14. The platform 12 is supported and stabilized by an elevator or vertically movable structure 16. A scissors lift mechanism 18 is provided in the embodiment shown. However, it is understood that other vertically movable structures or elevators can be used. In the preferred embodiment, the scissors lift mechanism 18 is a double scissors mechanism for increased stability, however, other scissors lifts may be used. The vertically movable structure 16 also includes at least one hydraulic cylinder 20, which is controlled by an electrically energized hydraulic power system including an electric motor 22 and control box 24, to cause the platform 12 to move upwardly and downwardly. Other conventional control and actuation systems can be used as desired such as a pneumatic system, for example. As illustrated, the raising and lowering system 10 is housed in a cavity or a pit 26 formed in the ground 28. Other configurations may be used above ground including ramps or other ingress and egress devices (not shown), for example, without departing from the scope and spirit of the invention. The platform 12 may be formed with a trap door or other access port (not shown) to facilitate entry into the pit 26 for maintenance or other purposes.

Figure 2:
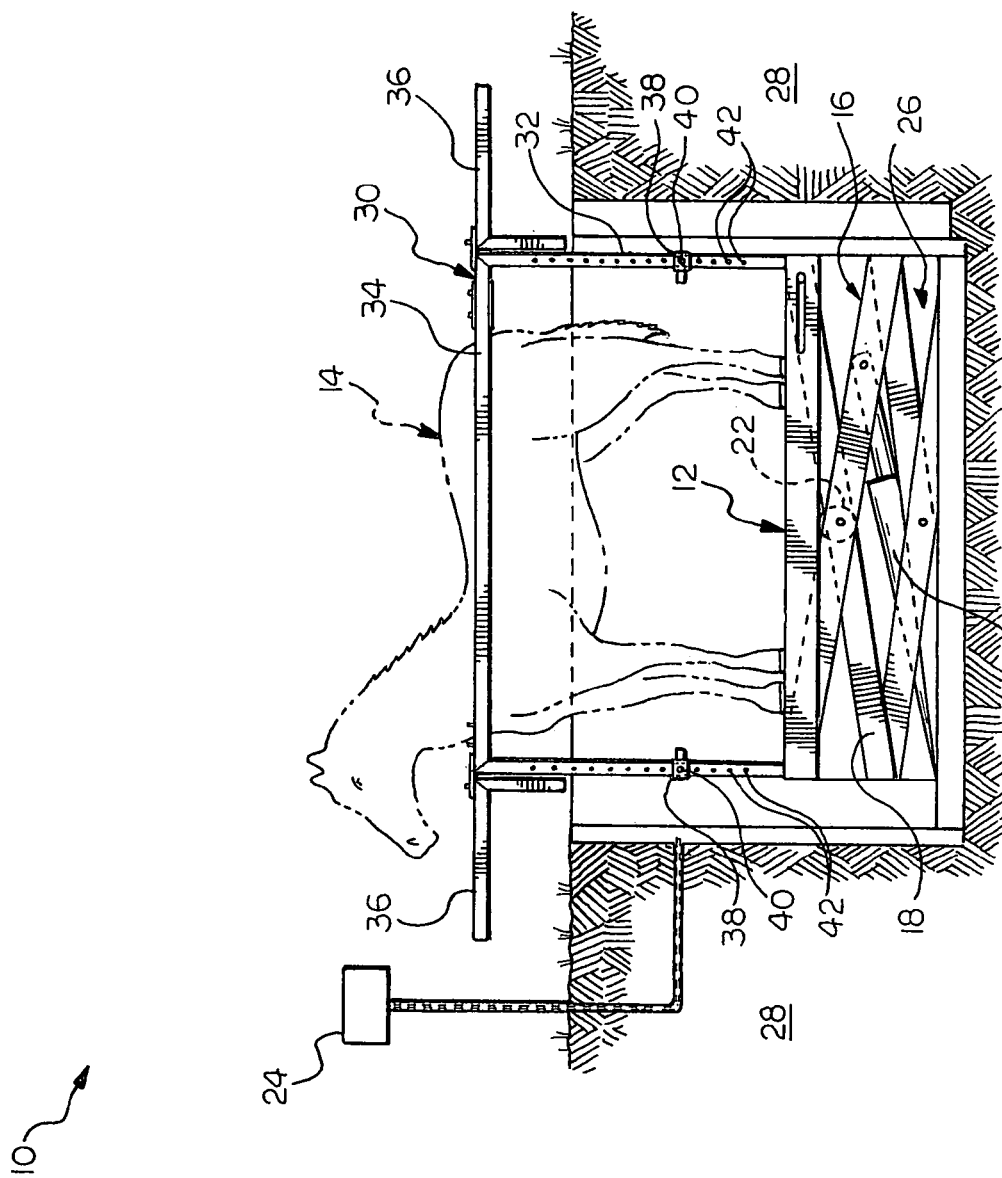
FIG. 2 is an elevational view similar to FIG. 1 showing the supported animal at a lower level or below ground level.
Figure 3:
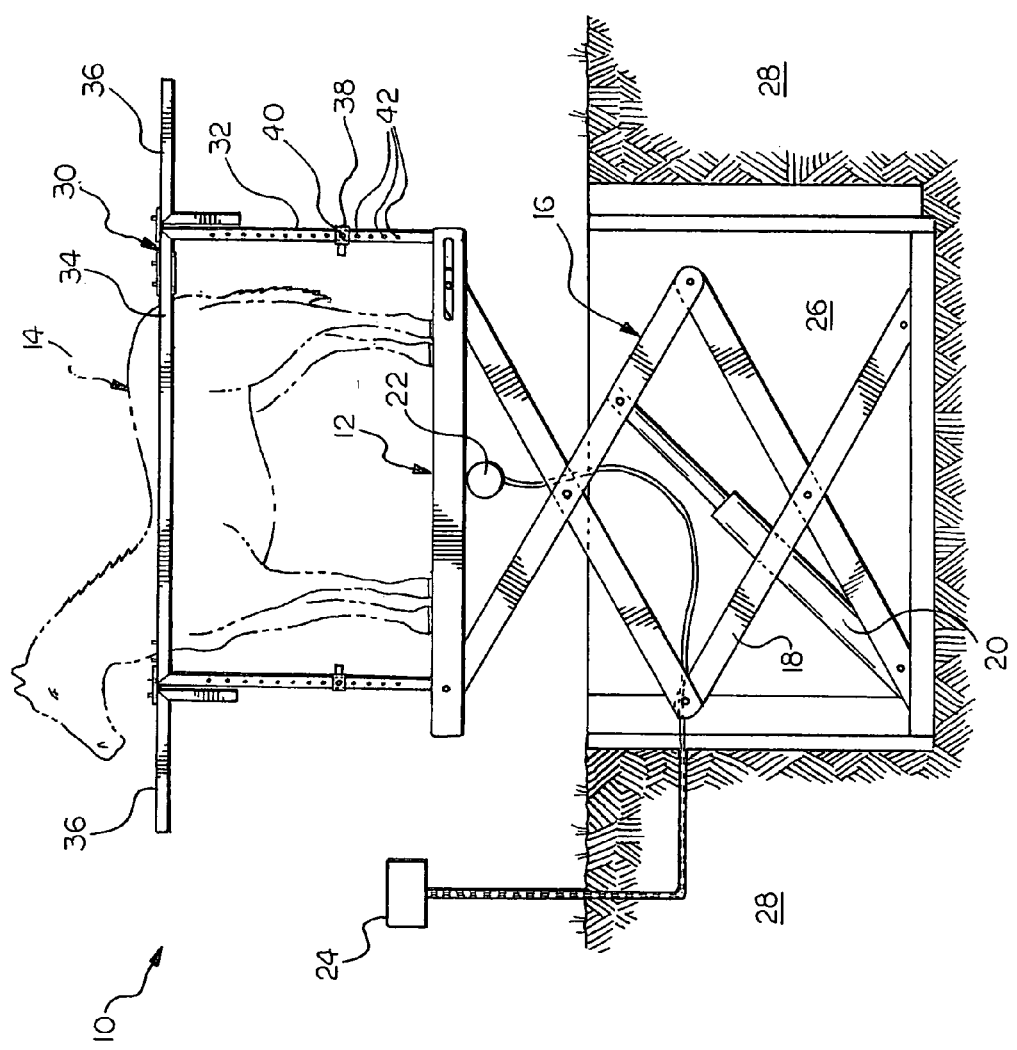
FIG. 3 is an elevational view similar to FIGS. 1 and 2 showing the supported animal at an upper level or above ground level.

A rail structure 30 is formed on and supported by the platform 12. Uprights 32 support horizontally disposed rails or side rails 34 and rail extensions 36. Adjustable tool brackets 38 are provided on the uprights 32. A spring-loaded locking pin 40 cooperates with vertically arranged spaced apart locking holes 42 to provide a locking mechanism to effect selective vertical positions for the brackets 38. However, other conventional locking mechanisms can be used such as clamp type, for example. FIGS. 1, 2, and 3, show the platform 12 in respective intermediate, lower, and upper levels.

Figure 4:
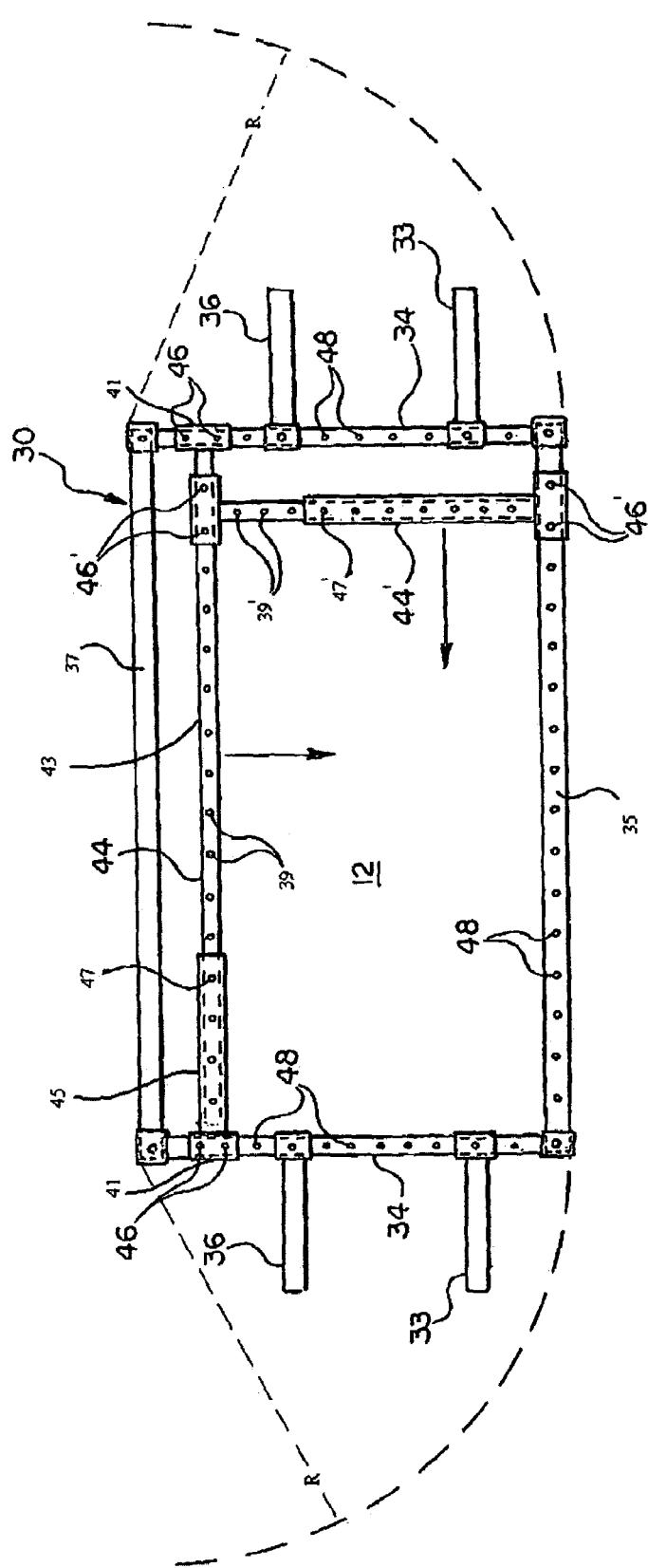
FIG. 4 is a fragmentary top plan view of the system illustrated in FIGS. 1, 2, and 3 showing the animal supporting platform is illustrated without the presence of the supported animal.

Referring to FIG. 4, the raising and lowering system 10 is shown without the presence of an animal 14. A pair of spaced apart end rails 34, a first side rail 35, and a second side rail 37 cooperate to form a generally rectangular area of confinement. The end rails 34 are hingedly mounted to the side rail 35 or the side rail 37 to swing through the radius R and out of the way to permit ingress and egress of an animal 14. A first extensible rail 44 having spaced apart opposing ends and containing holes 39 along its length is provided. The ends of the rail 44 terminate in brackets 41 that include locking pins 46. The rail 44 includes a first member 43 which is received inside the hollow interior of a second member 45. The length of the rail 44 can be adjusted by inserting the locking pin 47 which may be inserted into an aligned hole 39 of the first member 43 to attach the first member 43 to the second member 45. The length of the rail 44 can be adjusted by inserting the locking pin 47 into an alternate hole 39. The rail 44 is attached to the end rails 34 by aligning and inserting the locking pins 46 into hole 48 of the end rails 34. The locking pins 36 can be inserted into different holes 48 along the length of the end rails 34. Other conventional locking mechanisms can be used such as clamp type, for example. A second extensible rail 44' having a structure substantially identical to the first extensible rail 44 is provided. The first end of the rail 44' is attached to the first extensible rail 44 by aligning and inserting an associated locking pin 47' into an aligned hole 39 of the first extensible rail 44. The length of the second extensible rail 44' can be altered to accommodate different positions of the first extensible rail 44 on the end rails 34 by inserting the locking pin 47' into an alternate hole 39'. The second end of the rail 44' is attached to the side rail 35 by aligning and inserting an associated locking pin 46' into an aligned hole 48 of the side rail 35. The locking pins 46' can be aligned and inserted into different holes 39 and 48 along the length of the first extensible rail 44 and the side rail 34. The extensible rails 44 and 44' cooperate with the rails 34, 35, and 37 to create a relatively rectangular area of confinement. Alternate positioning of either or both of the extensible rails 44 and 44' changes the area of confinement. It is understood that was has been disclosed is the preferred embodiment of the invention. Alternate components may be used to form the rail structure described above without departing from the scope of the invention. Non-extensible rails may be used instead of extensible rails 44 and 44', for example. In that instance, a non-extensible intermediate rail is substituted for extensible rail 44, and a series of non-extensible rails is provided and one is selected and substituted for extensible rail 44'. The non-extensible rails each have a different length, and one is selected depending on the position of the non-extensible intermediate rail along the end rails 34.

Figure 6:
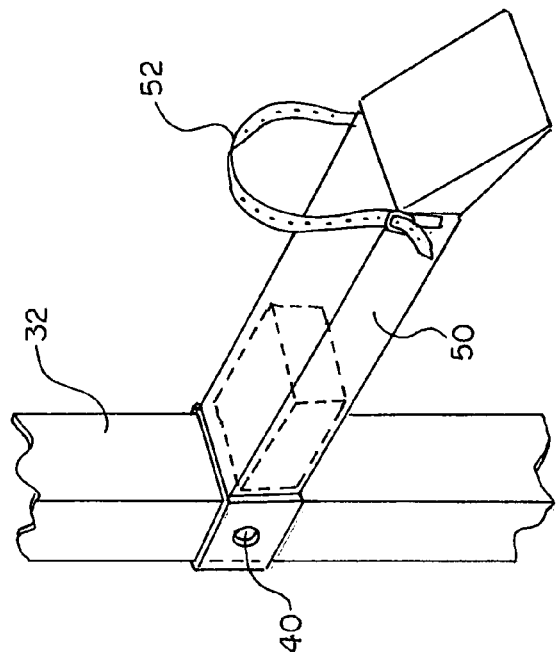
FIG. 6 is a fragmentary perspective view showing the shoeing plate illustrated in FIG. 5.
Figure 5:
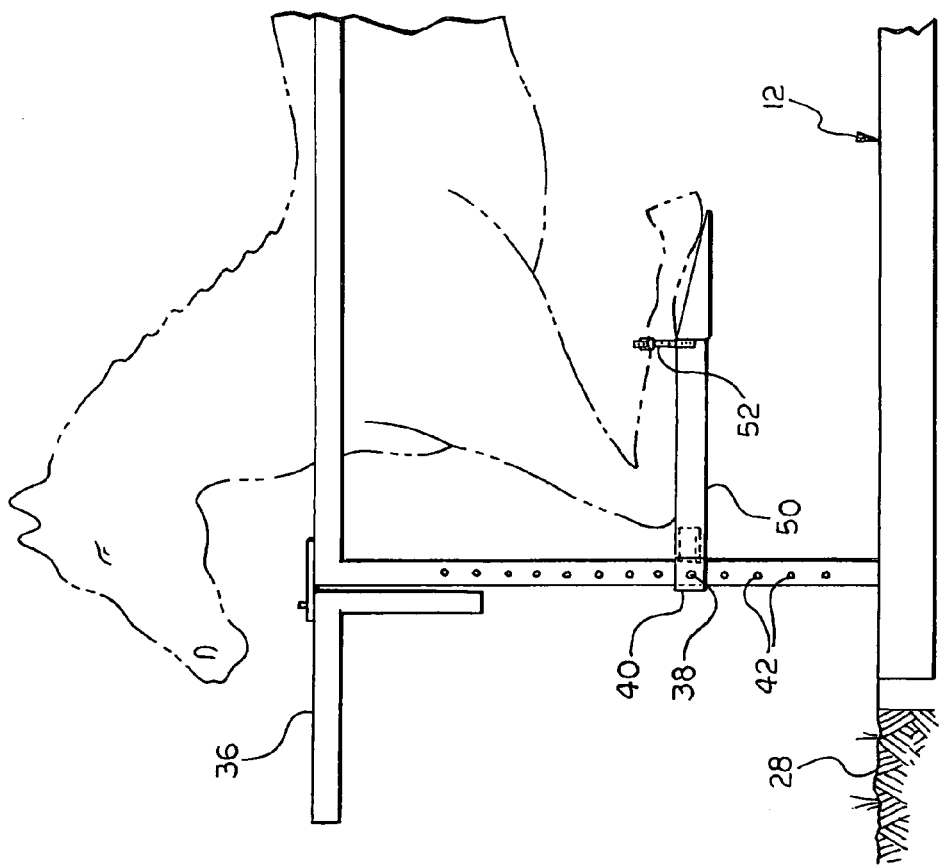
FIG. 5 is a fragmentary elevational view of the system illustrated in FIGS. 1–4 showing a shoeing plate.

FIGS. 5 and 6 illustrate a shoeing plate 50 removably attached to the bracket 38. The shoeing plate 50 includes a hold down strap 52 disposed thereon. The shoeing plate 50 can be rotated outwardly about a vertical axis.

In operation, the raising and lowering system 10 is operated by suitable mechanisms disposed in the control box 24. Typically, a first button (not shown) is depressed to energize the electric motor 22 of the associated hydraulic power system to cause the cylinders 20 to operate the scissors lift 18 and move the platform 12 from one horizontal position to another until a desired level is reached. A second button (not shown) may then be depressed to energize the hydraulic power system to cause the cylinder 20 to operate the scissors lift 18 and move the platform 12 to another horizontal position until another desired level is reached.

At the upper level or other desired position, a farrier can connect the shoeing plate 50 to the bracket 38 at a desired level. A leg 54 of the animal 14 can be rested on the shoeing plate 50 and held in place with the strap 52 as shown in FIG. 5. The animal 14 can also be restrained as desired using a lead rope (not shown) tied to the horizontally disposed rail 34 or the rail extension 36 and belly and back ropes (not shown) tied to the rails 34, if necessary. Additionally, grooming and treatment of illness or injury can be conducted. In the lower position, grooming and treatment of illness or injury can be conducted.

Locking mechanisms (not shown) are provided as a safety feature should the hydraulic power system fail during operation. The locking mechanisms lock the hydraulic power system in place to militate against the platform 12 moving until appropriate repairs can be made.

In order to facilitate animals 14 of different sizes, the intermediate rails 44 are provided to enclose and contact the body of the animal 14. For a larger animal 14 such as a draft horse, for example, the intermediate rails 44 can be moved to the position shown in FIG. 4. For a smaller animal 14 such as a pony, for example, the intermediate rails 44 can be adjusted to create a smaller inside area therebetween to more tightly and securely enclose the animal 14, as indicated by the arrows. Additionally, a spacer platform (not shown) can be placed on the platform 12 to raise shorter animals 14 to a safer desired height with respect to the rail structure 30. Height adjustable uprights 32 can also be used to facilitate safely handling the shorter animals 14.

In one embodiment of the invention, the platform 12 may travel through a total of sixty (60) inches, or thirty (30) inches above ground level and thirty (30) inches below ground level.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An animal raising and lowering system comprising:
   an animal supporting platform;
   a vertically movable structure mounted to said platform to cause said platform to move to selected vertical positions; and
   a rail structure supported by said platform said rail structure including a plurality of uprights and a plurality of horizontally disposed rails including a pair of end rails, a first side rail, a second side rail, an intermediate rail, and an extensible rail, wherein the intermediate rail is slidably connected to the end rails and the extensible rail is slidably connected to the intermediate rail and the first side rail to restrain an animal.

2. The animal raising and lowering system according to claim 1, wherein said vertically movable structure includes a scissors lift.

3. The animal raising and lowering system according to claim 2, wherein said vertically movable structure includes at least one hydraulic cylinder to operate the scissors lift and cause said platform to move between the selected vertical positions.

4. The animal raising and lowering system according to claim 3, wherein said vertically movable structure includes an electrical motor and an associated control system to control actuation of the at least one hydraulic cylinder.

5. The animal raising and lowering system according to claim 1, wherein said vertically movable structure is an electrically energized hydraulic power system.

6. The animal raising and lowering system according to claim 1, further comprising a shoeing plate to facilitate resting a leg of the animal thereon.

7. The animal raising and lowering system according to claim 6, wherein said shoe plate includes a strap disposed thereon to restrain the leg of the animal.

8. The animal raising and lowering system according to claim 6, wherein said shoe plate is height adjustable.

9. An animal raising and lowering system comprising:
   an animal supporting platform;
   a scissors lift mounted to said platform to cause said platform to move to selected vertical positions;
   an electrically energized hydraulic power system to operate said scissors lift and cause said platform to move to the selected vertical positions; and
   a rail structure supported by said platform, said rail structure including a plurality of uprights and a plurality of horizontally disposed end rails and side rails, an intermediate rail adjustable in a direction substantially parallel to the end rails, and an extensible rail adjustable in a direction substantially parallel to the side rails to restrain an animal.

10. The animal raising and lowering system according to claim 9, wherein said scissors lift is housed in a pit.

11. The animal raising and lowering system according to claim 9, wherein said electrically energized hydraulic power system includes at least one hydraulic cylinder, an electrical motor, and an associated electrical control system to control actuation of the at least one hydraulic cylinder.

12. The animal raising and lowering system according to claim 9, further comprising a shoeing plate to facilitate resting a leg of the animal thereon.

13. The animal raising and lowering system according to claim 12, wherein said shoe plate is height adjustable.

14. An animal raising and lowering system comprising:
   a platform for supporting an animal and movable between selected vertical positions;
   a scissors lift mounted below and supporting said platform, said scissors lift mounted in a pit;
   an electrically energized hydraulic power system to operate said scissors lift and cause said platform to move to the selected vertical positions;
   a rail structure supported by said platform to restrain the animal, said rail structure including a plurality of uprights, a plurality of horizontally disposed rails, including a pair of end rails, a first side rail, a second side rail, an intermediate rail, and an extensible rail, wherein the intermediate rail is slidably connected to the end rails and the extensible rail is slidably connected to the intermediate rail and the first side rail to facilitate restraining different sized animals on said platform; and
   a shoeing plate to facilitate resting a leg of the animal thereon, said shoe plate being height adjustable.

* * * * *